(12) United States Patent  
Grimm

(10) Patent No.: US 7,675,274 B2  
(45) Date of Patent: Mar. 9, 2010

(54) CIRCUIT ARRANGEMENT FOR AIRCRAFT ENGINE REGULATORS

(75) Inventor: Lutz Grimm, Hettenhausen (DE)

(73) Assignee: MTU Aero Engines GmbH, Munich (DE)

( * ) Notice: Subject to any disclaimer, the term of this patent is extended or adjusted under 35 U.S.C. 154(b) by 412 days.

(21) Appl. No.: 10/594,305

(22) PCT Filed: Mar. 3, 2005

(86) PCT No.: PCT/DE2005/000358

§ 371 (c)(1),
(2), (4) Date: Jun. 29, 2007

(87) PCT Pub. No.: WO2005/096487

PCT Pub. Date: Oct. 13, 2005

(65) Prior Publication Data

US 2007/0279956 A1    Dec. 6, 2007

(30) Foreign Application Priority Data

Mar. 26, 2004   (DE) .................. 10 2004 014 767

(51) Int. Cl.
  *G05F 1/40* (2006.01)
  *G05F 1/56* (2006.01)
(52) U.S. Cl. .................. 323/271; 323/268

(58) Field of Classification Search ......... 323/222–225, 323/268, 271, 282, 349–351
See application file for complete search history.

(56) References Cited

U.S. PATENT DOCUMENTS

| | | | |
|---|---|---|---|
| 4,404,473 A * | 9/1983 | Fox | 307/125 |
| 6,208,540 B1 * | 3/2001 | O'Meara et al. | 363/98 |
| 6,404,655 B1 | 6/2002 | Welches | 363/41 |
| 7,122,994 B2 * | 10/2006 | Anghel et al. | 322/60 |
| 2003/0063482 A1 | 4/2003 | Carsten | 363/89 |
| 2003/0090228 A1 | 5/2003 | Wilkens | 318/560 |

* cited by examiner

*Primary Examiner*—Matthew V Nguyen
(74) *Attorney, Agent, or Firm*—Davidson, Davidson & Kappel, LLC

(57) ABSTRACT

A circuit arrangement for aircraft engine regulators, for providing or generating a bipolar output direct current signal as a function of at least one pulse-width modulated input signal is disclosed. Said circuit arrangement comprises at least two driver stages, each driver stage being controllable by a pulse-width modulated input signal and wired up to preferably one step-down actuator stage in such a way that, for the control of a first driver stage, a first switching device of a step-down actuator stage controls a low-pass filter device of the step-down actuator stage, and for the control of a second driver stage, a second switching device of the step-down actuator stage controls the low-pass filter device of the step-down actuator stage.

12 Claims, 2 Drawing Sheets

CIRCUIT ARRANGEMENT FOR AIRCRAFT ENGINE REGULATORS

BACKGROUND

The present invention relates to a circuit arrangement for aircraft engine controllers.

Digital controllers which have the ability to process complex control algorithms within the shortest period of time are increasingly used as aircraft engine controllers. The digital controllers increasingly replace controllers designed to use analog technology. Digital aircraft engine controllers are used, in particular, for controlling actuators to be operated with direct current; such an actuator may be a torque motor, for example. By using such a torque motor or a d.c.-operated actuator, the fuel supply to the aircraft engine may be influenced, for example. Further areas of application, in which torque motors or d.c.-operated actuators are used, are, for example, reversing the guide blades in an aircraft engine or adjusting nozzles in aircraft engines. As a rule, digital aircraft engine controllers provide a digital output signal, it being necessary for activating a d.c.-operated actuator using such a digital output signal to convert the digital output signal of the digital aircraft engine controller into a direct current signal.

According to the related art, the digital output signals are converted into a direct current signal by using expensive digital-to-analog converters or by using expensive single-bit converters and analog amplifier modules. The circuits known from the related art are thus altogether complex and expensive.

SUMMARY OF THE INVENTION

An object of the present invention is to create a novel circuit arrangement for aircraft engine controllers.

According to the present invention, a circuit arrangement for aircraft engine controllers may be used for providing or generating a bipolar direct current output signal as a function of at least one pulse-width modulated input signal. The circuit arrangement includes at least two driver stages, each driver stage being activatable by a pulse-width modulated input signal, and the or each driver stage being preferably connected to a step-down converter stage in such a way that when a first driver stage is activated by a pulse-width modulated input signal, a first switching element of a step-down converter stage activates a low-pass device of the step-down converter stage and that when a second driver stage is activated by a pulse-width modulated input signal, a second switching element of the step-down converter stage activates the low-pass device of the step-down converter stage.

With the aid of the present invention, a circuit arrangement for aircraft engine controllers is proposed for providing a direct current output signal as a function of at least one pulse-width modulated, digital input signal which functions without expensive digital-to-analog converters or expensive single-bit converters. The circuit according to the present invention allows the use of small, inexpensive output semiconductors. The circuit according to the present invention is characterized by small size, low weight, and high reliability. The present invention makes it possible to simply generate a variable, controllable, and bipolar direct current source.

Preferred refinements of the present invention arise from the subclaims and the following description. Exemplary embodiments, without being restricted thereto, are explained in greater detail on the basis of the drawing.

The present invention is described in greater detail in the following with reference to FIGS. 1 and 2.

DETAILED DESCRIPTION

Figure 1:
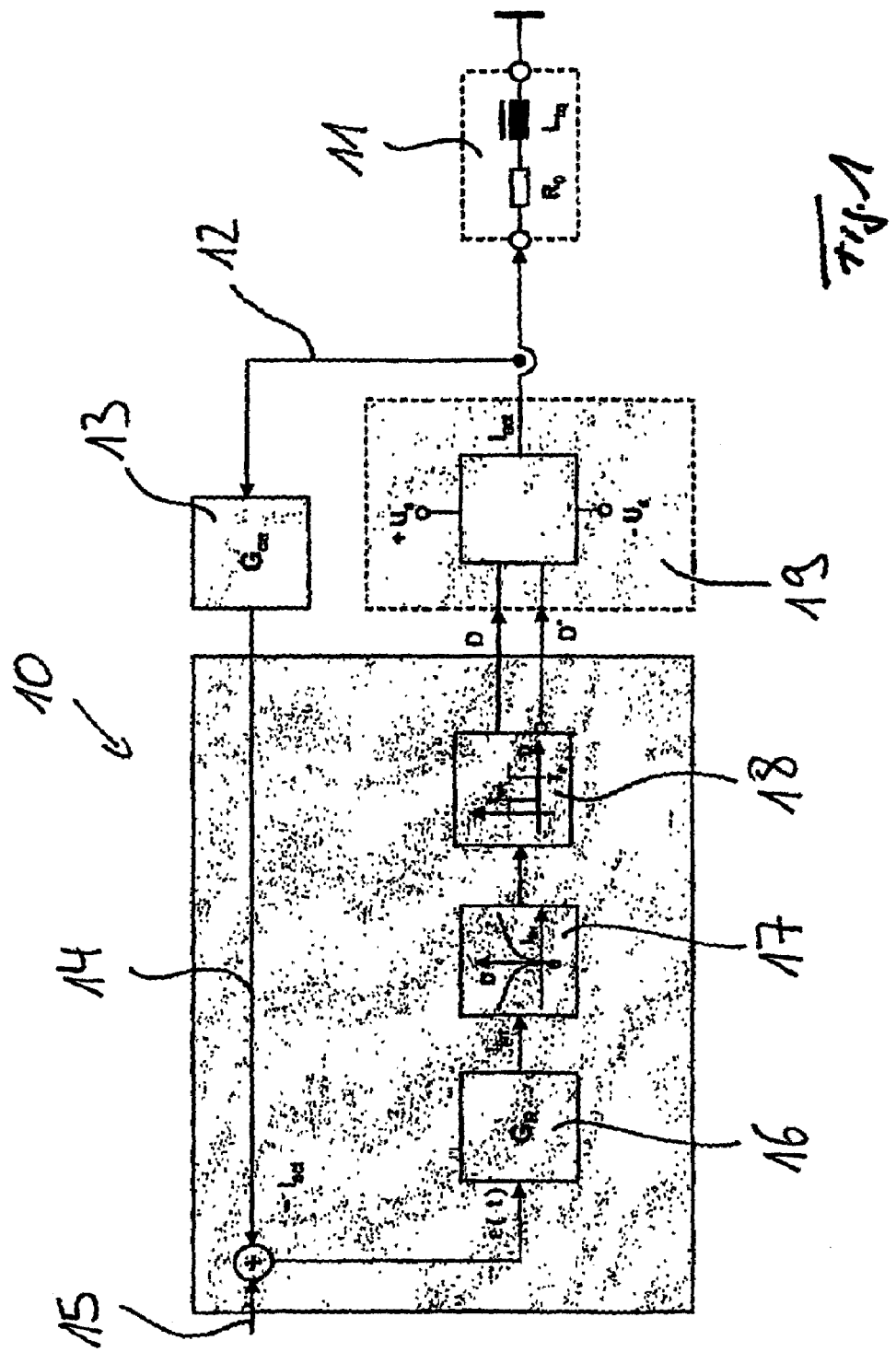
FIG. 1 shows a block diagram of an aircraft engine controller including the circuit arrangement according to the present invention.

FIG. 1 shows a block diagram of an aircraft engine controller 10 for activating an actuator 11 to be operated using direct current. D.c.-operated actuator 11 is a torque motor in particular. As is apparent from FIG. 1, actuator 11 to be operated or activated represents an ohmic load and an inductive load, the ohmic resistance of actuator 11 being indicated in FIG. 1 with $R_0$ and the inductivity of actuator 11 being indicated with $L_{tq}$.

The function of the aircraft engine controller is to activate actuator 11 using a defined direct current signal $I_{act}$. The actual control current is measured for this purpose and a corresponding measuring signal 12 is conveyed to a block 13, block 13 representing a difference amplifier stage having a downstream analog-to-digital converter. Output signal 14 of block 13 is thus a digitized measuring signal which is compared in aircraft engine controller 10 with a digital setpoint signal 15. Error signal $\epsilon$ (t), the difference between digitized measuring signal 14 and corresponding setpoint signal 15, is conveyed to a digital current controller 16. Digital current controller 16 is preferably designed as a PID controller (proportional-plus-integral-plus-derivative controller) and provides an output signal $I_{lin}$, output signal $I_{lin}$ being linearized in blocks 17 and 18 and converted into pulse-width modulated output signals D and D* of aircraft engine controller 10.

The present invention relates to a circuit 19 in order to provide a corresponding direct current control signal $I_{act}$ from digital pulse-width modulated output signals D and D* provided by aircraft engine controller 10 for activating actuator 11. As is apparent from FIG. 1, pulse-width modulated output signals D, D* of aircraft engine controller 10 are conveyed as input signals to circuit 19 according to the present invention. Circuit 19 according to the present invention outputs a direct current signal $I_{act}$ as an output signal.

Figure 2:
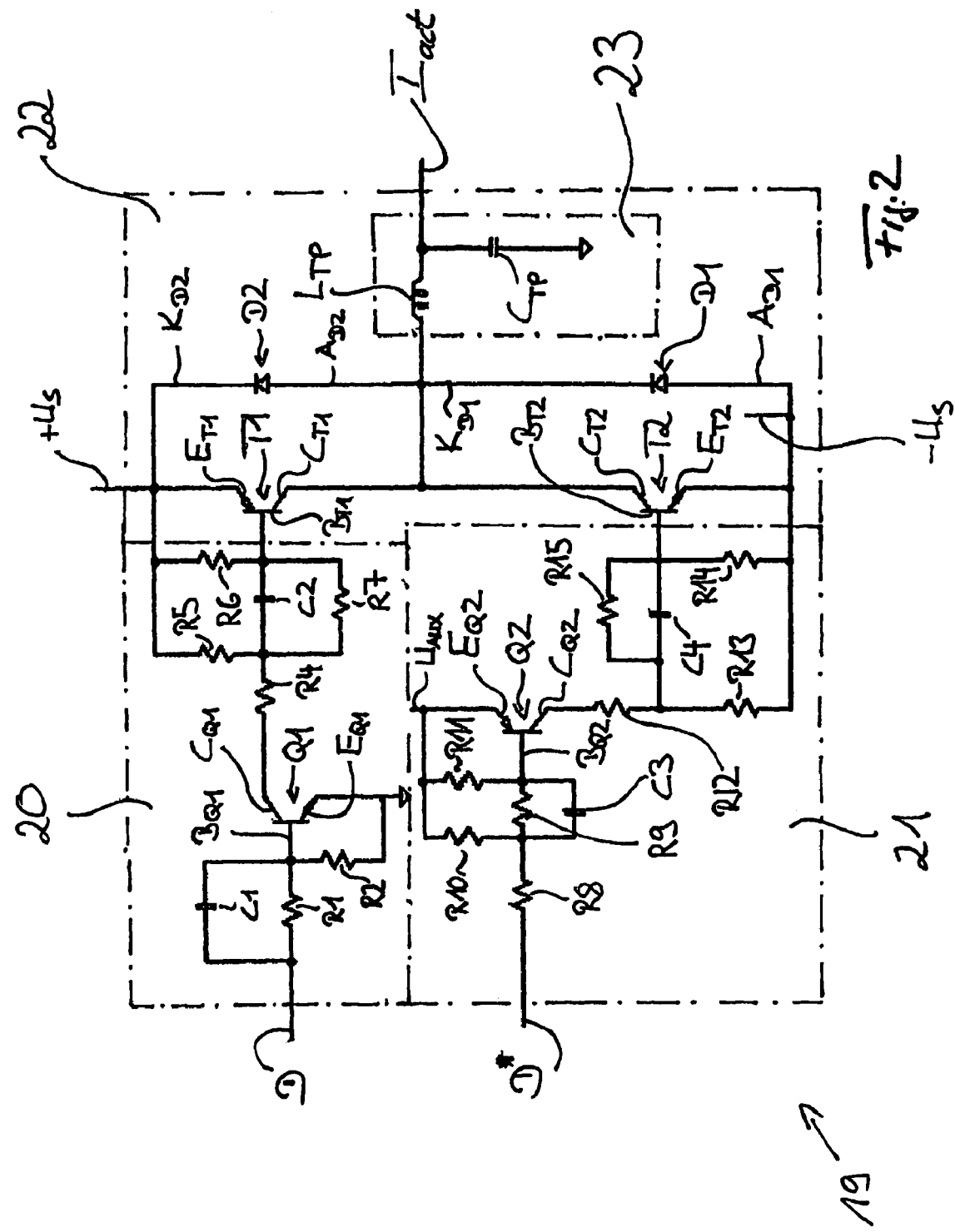
FIG. 2 shows a detailed block diagram of the circuit arrangement according to the present invention.

Control circuit 19 according to the present invention is shown in greater detail in FIG. 2. In the preferred exemplary embodiment of FIG. 2, circuit 19 according to the present invention includes two driver stages 20 and 21. Both driver stages 20 and 21 are connected to a step-down converter stage 22. As is apparent from FIG. 2, each of the two driver stages 20 and 21 is activatable with a pulse-width modulated input signal D or D*; step-down converter stage 22 outputs the intended direct current signal $I_{act}$.

First driver stage 20 includes a transistor Q1 according to FIG. 2; a pulse-width modulated input signal D may be applied to a base $B_{Q1}$ of transistor Q1 via a resistor R1. A capacitor C1 is connected in parallel to resistor R1. Another resistor R2 is connected between base $B_{Q1}$ and emitter $E_{Q1}$ of transistor Q1 of first driver stage 20. According to FIG. 2, additional resistors R4, R5, R6, and R7 are connected to collector $C_{Q1}$ of transistor Q1 of first driver stage 20, the additional resistors being connected to a capacitor C2 according to FIG. 2. Transistor Q1 of first driver stage 20 is designed as an NPN transistor.

Second driver stage 21 also includes a transistor Q2. Pulse-width modulated signal D* may be applied to base $B_{Q2}$ of transistor Q2 of second driver stage 21 via resistors R8 and R9. A capacitor C3 is connected in parallel to resistor R9. Moreover, additional resistors R10 and R11 are connected in parallel to resistor R9. Resistors R10 and R11 are also connected to emitter $E_{Q2}$ of transistor Q2 of second driver stage 21. Additional resistors R12, R13, R14, R15 and another capacitor C4 are connected to collector $C_{Q2}$ of transistor Q2 of second driver stage 21 according to FIG. 2. The exact wiring of these modules is apparent in FIG. 2. Transistor Q2 of second driver stage 21 is designed as a PNP transistor. As is apparent from FIG. 2, a supply voltage $U_{AUX}$ for second driver stage 21, which preferably corresponds to the supply voltage of the microprocessor of digital aircraft engine controller 10, is applied to emitter $E_{Q2}$ of transistor Q2.

It should be pointed out here that in the event that a positive direct current output signal $I_{act}$ is to be provided, pulse-width modulated input signal D acts upon first driver stage 20; a constant or permanent high-level signal, however, acts upon second driver stage 21. If a negative current output signal $I_{act}$ is to be provided, pulse-width modulated input signal D* acts upon second driver stage 21; in contrast, a constant or permanent low-level signal acts upon first driver stage 20. If a zero current is to be provided as the output signal of circuit 19, the low-level signal constantly or permanently acts upon first driver stage 20 and the high-level signal constantly or permanently acts upon second driver stage 21.

As is apparent from FIG. 2, step-down converter stage 22 includes a low-pass filter 23 which in turn includes an inductor $L_{TP}$ and a capacitor $C_{TP}$. Inductor $L_{TP}$ of low-pass filter 23 operates in what is known as pulsating operation. In addition to low-pass filter 23, step-down converter stage 22 includes two switching elements.

A first switching element is formed by a transistor T1 and a diode D1, the first switching element made up of transistor T1 and diode D1 cooperating with first driver stage 20. A second switching element of step-down converter stage 22 is formed by a transistor T2 and a diode D2, transistor T2 and diode D2 of this second switching element cooperating with second driver stage 21. If pulse-width modulated signal D acts upon first driver stage 20 and a permanent high-level signal acts upon second driver stage 21 for providing a positive current output signal, then the first switching element made up of transistor T1 and diode D1 activates low-pass filter 23 of step-down converter stage 22. If, however, pulse-width modulated signal D* acts upon second driver stage 21 and a permanent low-level signal acts upon first driver stage 20 for providing a negative direct current output signal, then the second switching element made up of transistor T2 and diode D2 activates low pass filter 23 of step-down converter stage 22.

As is apparent from FIG. 2, transistor T1 of the first switching element is designed as a PNP transistor, resistors R5 and R6 of first driver stage 20 and a positive supply voltage terminal $+U_S$ for circuit 19 being connected to emitter $E_{T1}$ of PNP transistor T1. In contrast, transistor T2 of the second switching element of step-down converter stage 22 is designed as an NPN transistor, resistors R13 and R14 of second driver stage 21 and negative supply voltage terminal $-U_S$ being connected to emitter $E_{T2}$ of NPN transistor T2. Collector $C_{T1}$ of PNP transistor T1 of the first switching element and collector $C_{T2}$ of NPN transistor T2 of the second switching element are connected to one another. Moreover, inductor $L_{TP}$ of low-pass filter 23 is connected to collectors $C_{T1}$ and $C_{T2}$ of these two transistors T1 and T2.

Diode D1 cooperates with PNP transistor T1 of the first switching element of step-down converter stage 22. Diode D1 is connected to NPN transistor T2 in such a way that anode $A_{D1}$ of diode D1 is connected to emitter $E_{T2}$ of transistor T2 and cathode $K_{D1}$ of diode D1 is connected to collector $C_{T2}$ of transistor T2. Diode D2 cooperates with NPN transistor T2 of the second switching element, diode D2 being connected, according to FIG. 2, to transistor T1 of the second switching element in such a way that cathode $K_{D2}$ of diode D2 is connected to emitter $E_{T1}$ of PNP transistor T1 and anode $A_{D2}$ of diode D2 is connected to collector $C_{T1}$ of transistor T1. Since the two diodes D1 and D2 are connected to one another in such a way that cathode $K_{D1}$ of diode D1 is connected to anode $A_{D2}$ of diode D2, cathode $K_{D1}$ of diode D1 is furthermore connected to collector $C_{T1}$ of PNP transistor T1 and anode $A_{D2}$ of diode D2 is connected to collector $C_{T2}$ of NPN transistor T2.

Circuit arrangement 19 according to the present invention thus includes two driver stages 20 and 21 which cooperate with a step-down converter stage 22. Step-down converter stage 22 includes one switching element for each driver stage 20 and 21, each of the two switching elements preferably being formed by a transistor T1 and T2 and diodes D1 and D2 which cooperate with transistors T1 and T2. Depending on the activation of driver stages 20 and 21 using pulse-width modulated signals D and D*, either the first switching element made up of transistor T1 and diode D1 cooperating with first driver stage 20 or the second switching element made up of transistor T2 and diode D2 of step-down converter stage 22 cooperating with second driver stage 21 acts upon a low-pass filter 23 of step-down converter stage 22.

If, for example, pulse-width modulated signal D acts upon first driver stage 20 and a permanent high-level signal acts upon second driver stage 21 for providing a positive direct current output signal $I_{act}$, then the switching element formed by transistor T1 and diode D1 and cooperating with first driver stage 20 acts upon low-pass filter 23 of step-down converter stage 22. The second switching element including transistor T2 and diode D2 plays a secondary role in this case. If, in this case, pulse-width modulated signal D has a high level, then transistor T1 of the first switching element of step-down converter stage 22 is conductive and an appropriate current flows toward low-pass filter 23. If, however, pulse-width modulated signal D has a low level then transistor T1 of the first switching element is closed and impedance current $I_{TP}$ in low-pass filter 23 commutates from transistor T1 of step-down converter stage 22 to diode D1 of step-down converter stage 22. An appropriate operating mode of circuit 19 according to the present invention results when a permanent low-level signal acts upon first driver stage 20 and pulse-width modulated signal D* acts upon second driver stage 21 for providing a negative direct current output signal.

What is claimed is:

1. A circuit arrangement for aircraft engine controllers for providing or generating a bipolar direct current output signal as a function of at least one pulse-width modulated input signal, comprising: a first driver stage and a second driver stage, the first and the second driver stages being activatable by a pulse-width modulated input signal, and at least one of the first and second driver stages being connected to a step-down converter stage so that, when the first driver stage is activated, a first switching element of the step-down converter stage activates a low-pass device of the step-down converter stage, and, when the second driver stage is activated, a second switching element of the step-down converter stage activates the low-pass device of the step-down converter stage.

2. The circuit arrangement as recited in claim 1, where each of the first and second driver stages is connected to the buck converter stage.

3. The circuit arrangement as recited in claim 1, wherein each of the first and second switching elements of the step-down converter stage includes at least one transistor.

4. The circuit arrangement as recited in claim 3, wherein a diode cooperates with the transistors of the first and second switching elements of the step-down converter stage.

5. The circuit arrangement as recited in claim 2, where the low-pass device of the step-down converter stage includes an inductor operating in pulsating operation.

6. The circuit arrangement as recited in claim 2, wherein, when a positive output direct current signal is to be provided by the circuit arrangement, the first driver stage is activated by the pulse-width modulated input signal, while a permanent high-level signal acts upon the second driver stage, and that the first switching element of the step-down converter stage subsequently activates the low-pass device of the step-down converter stage.

7. The circuit arrangement as recited in claim 2, wherein, when a negative direct current output signal is to be provided by the circuit arrangement, the second driver stage is activated by the pulse-width modulated input signal, while a permanent low-level signal acts upon the first driver stage, and that the second switching element of the step-down converter stage subsequently activates the low-pass device of the step-down converter stage.

8. The circuit arrangement as recited in claim 2, wherein the first switching element includes a PNP transistor and the second switching element includes an NPN transistor, a base of the PNP transistor of the first switching element is connected to the first driver stage and another base of the NPN transistor of the second switching element is connected to the second driver stage, a collector of the PNP transistor of the first switching element is connected to another collector of the NPN transistor of the second switching device, and an emitter of the PNP transistor of the first switching element being connected to a positive supply voltage terminal and another emitter of the NPN transistor of the second switching element being connected to a negative supply voltage terminal.

9. The circuit arrangement as recited in claim 8, wherein a diode cooperates with the PNP transistor of the first switching element and is connected to the NPN transistor of the second switching element so that the cathode of one diode is connected to the other collector and the anode of the diode is connected to the other emitter of the NPN transistor.

10. The circuit arrangement as recited in claim 8, wherein a diode cooperates with the NPN transistor of the second switching element and is connected to the PNP transistor of the first switching element so that the cathode of the diode is connected to the emitter and the anode of the diode is connected to the collector.

11. The circuit arrangement as recited in claim 8, wherein a diode having a cathode cooperates with the PNP transistor of the first switching element and is connected to the collector of the PNP transistor and that the anode of the diode cooperates with the NPN transistor of the second switching element and is connected to the other collector.

12. The circuit arrangement as recited in claim 8, wherein each of the first and second driver stages includes a transistor and resistors and capacitors connected to the transistor.

\* \* \* \* \*